UNITED STATES PATENT OFFICE.

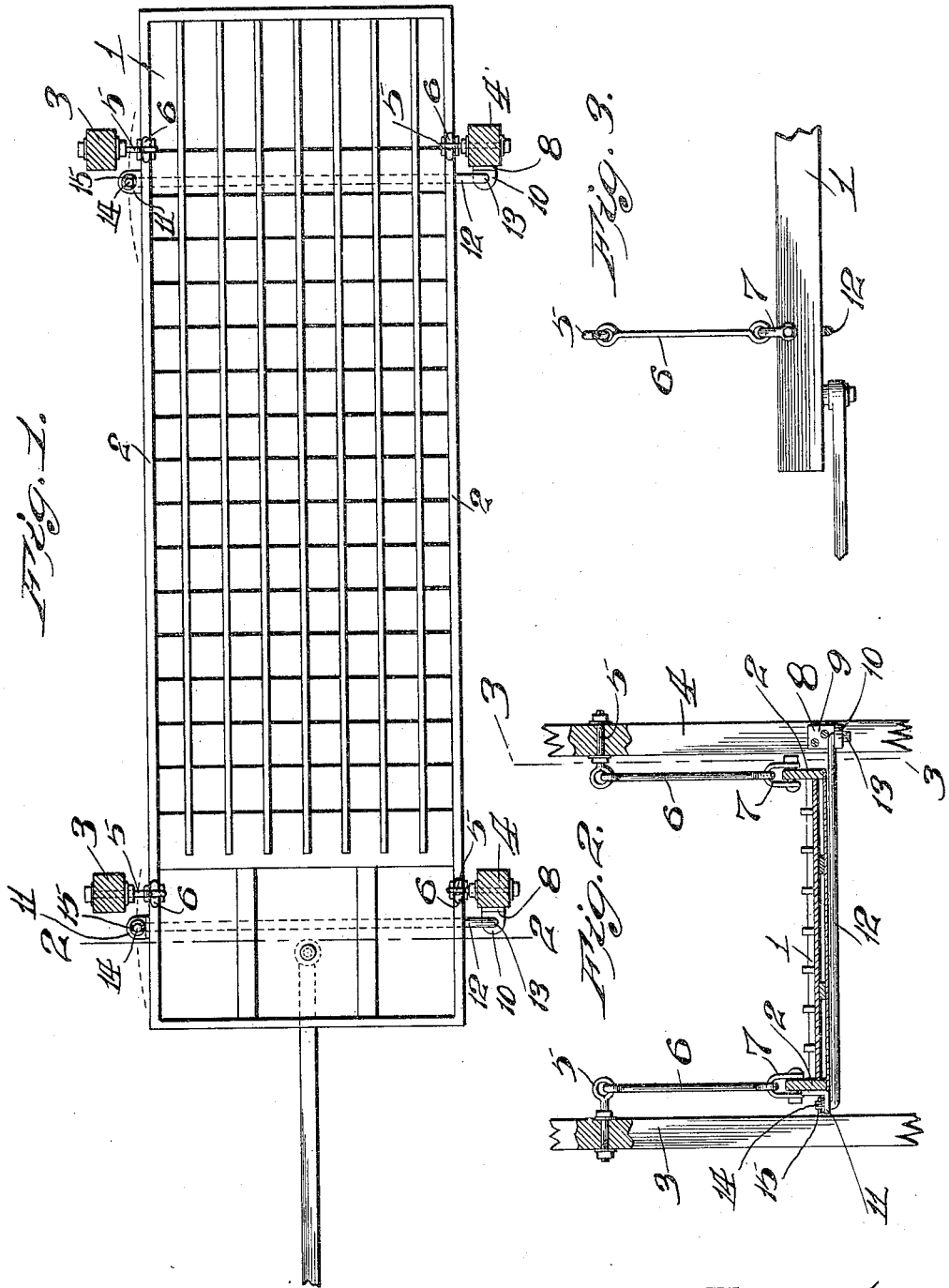

LOUIS MEYER, OF ST. LOUIS, MISSOURI.

GUIDE FOR SEPARATOR-PANS.

935,041.  Specification of Letters Patent.  Patented Sept. 28, 1909.

Application filed April 12, 1909. Serial No. 489,511.

*To all whom it may concern:*

Be it known that I, LOUIS MEYER, a citizen of the United States, and resident of St. Louis, Missouri, have invented certain new and useful Improvements in Guides for Separator-Pans, of which the following is a specification containing a full, clear, and exact description, reference being had to the accompanying drawings, forming a part hereof.

My invention relates to improvements in guides for grain pans in separators, and the object of my invention is to provide a simple and inexpensive device which may be applied to the various types of grain pans of threshing machines which are now in use, and which device is adapted to prevent the lateral movement of the pan incident to its operation.

To the above purposes, my invention consists in certain novel features of construction and arrangement of parts which will be hereinafter more fully set forth, pointed out in the claims and illustrated in the accompanying drawings, in which:

Figure 1 is a top plan view of one form of separator pan which is used in threshing machines, the framing timbers of the separator being shown in section; Fig. 2 is a section taken on the line 2—2 of Fig. 1; Fig. 3 is a section taken on the line 3—3 of Fig. 2.

Referring by numerals to the accompanying drawings: 1 indicates the separator pan, which may be of any desired construction, and 2 indicates the side framing of said separator pan.

3 and 4 indicate vertical framing members which are usually employed in separator construction. Mounted in the upright framing members 3 and 4 are eye bolts 5, and mounted in said eye bolts 5 are depending rods 6, the lower ends of which rods are secured to the side framing 2 of the separator pan by means of a clevis 7, this being the usual construction for supporting and suspending the separator pan. The separator pan is operated in the usual way, and heretofore the usual operation of the separator pan, especially if the separator is not level incident to said operation of the separator pan, it will swing from one side to the other and come in contact with the upright framing 3 and 4. This has been found to be very objectionable, as the striking of the separator pan against these members will wear away the side framing of the separator pan, also mar the upright post and will prevent the free operation of the separator pan. To overcome these objections, I have devised a simple and inexpensive device which may be applied to any form of separator pan, which will not interfere with its operation and will prevent the objectionable features above noted.

The description of my guide is as follows: 8 indicates a bracket which is bent in the form of a right angle and composed of two parts formed integral, 9 and 10. The part 9 is provided with perforations, by means of which the bracket may be secured to the upright framing timbers 3 and 4. The part 10 is provided with a circular opening which part 10 is formed at right angles to the portion 9 and projects horizontally when the bracket is secured either to the upright timbers 3 or 4. 11 indicates a similar bracket which I secure to the framing of the separator pan, one member of this bracket being provided with a circular opening, which projects outwardly and horizontally from the separator pan when the bracket is applied to it.

In practice I secure to the separator pan two of said brackets, and opposite to each one of said brackets I secure a similar bracket to the upright post 4.

12 indicates a connecting rod for the brackets carried by the upright framing members and the brackets carried by the separator pan. Each end of said rod 12 is provided with a stud 13 and 14, the said studs being formed by bending the ends of said rod at right angles to the main body of the rod. The stud 14 is provided with an opening through which is inserted a key 15 for holding said stud in the hole in the bracket 11. The stud 13 is adapted to be inserted in the opening formed in the portion 10 of the bracket 8, said stud 13 projecting downwardly, as shown in Fig. 2, and is held in said bracket by the weight of the rod.

From the construction heretofore described, it will be seen that each end of the rod is pivoted in the bracket carried by the upright members, and also, by the brackets carried by the separator pan. In practice I employ two such connecting rods, one at the forward end of the separator pan and one at the rear end, and by having the ends or studs formed on said rod, mounted in fixed bearings carried by the upright framing members, any lateral movement of the separator pan will be obviated, and the separator pan will be caused to travel in a defined plane.

My invention is equally applicable to what is known as the separator shoe in threshing machines, and when so applied always keeps it in a defined plane and prevents its side motion incident to its operation.

I claim:

1. A guide for grain pans in separators, comprising a bracket fixed to one side of the separator frame and a bracket fixed to the grain pan adjacent the opposite side of the separator frame and a rod carried by said brackets.

2. A guide for grain pans in separators, comprising a bracket fixed to one side of the separator frame, a bracket fixed to the grain pan adjacent the opposite side of the separator frame and a rod having studs connecting said brackets whereby the grain pan may be moved longitudinally and is held against contact with the separator frame.

In testimony whereof, I have signed my name to this specification, in presence of two subscribing witnesses.

LOUIS MEYER.

Witnesses:
E. E. LONGAN,
E. L. WALLACE.